Patented Dec. 27, 1949

2,492,428

UNITED STATES PATENT OFFICE 2,492,428

CONTROLLING THE AGING OF XANTHATES

John P. Hollihan, Jr., Garden City, and Sanford A. Moss, Jr., Ridley Park, Pa., assignors to American Viscose Corporation, Wilmington, Del., a corporation of Delaware No Drawing. Application August 12, 1944, Serial No. 549,290

4 Claims. (Cl. 260—216)

This invention relates to unstable xanthates, such as those of polymeric carbohydrates and particularly of cellulose.

Such xanthates, and especially cellulose xanthate, as well as their solutions, such as viscose, are unstable and tend to hydrolyze so that xanthate groups gradually break away and are converted into sulfur-containing by-products. As the cellulose xanthate gradually loses its xanthate groups, it becomes progressively more insoluble, and this phenomenon is termed "aging." It is common practice to measure the degree of solubility by determining the concentration of a salt, such as ammonium chloride or sodium chloride which will cause precipitation or gelation of the xanthate. Younger or fresher xanthates which have only partially lost their solubility, have higher salt points. In the following description, salt point will refer to this index as determined with sodium chloride.

In accordance with this invention, it has been found that the addition to the cellulose xanthate or a solution thereof of an organic compound which is soluble at least to some extent in the aqueous or alkaline medium containing the xanthate and having under the conditions of the xanthate solution a conjugated chain capable of reacting by a process of 1:4 addition can reverse the hydrolysis or stabilize the xanthate for extended periods of time. The expression "process of 1:4 addition" refers to the supposed mechanism of the addition type of reaction of such compounds, in which an intermediate is first formed by adding to the carbons or other atoms at the extreme ends of the four-membered conjugate chain. This reaction mechanism is sometimes referred to as "allylic rearrangement." By using the former expression, it is not intended to limit the scope of the claims to four-atom chains since longer chains including a conjugated portion may be considered to be merely a short-chain conjugated compound carrying substituents on one or both extreme atoms of the conjugated portion. Examples of such compounds which are hereinafter referred to as age-controlling compounds, are as follows:

Acrylonitrile
β-Methylacrylonitrile
Acrylamide
N-methyl acrylamide
N-butyl acrylamide
α-Methyl acrylamide
N-cyclohexyl acrylamide
Crotonamide (β-methyl acrylamide)
α-Terpinene
β-Terpinene (Δ3,8(9)-menthadiene)
Allyl cyanide Allyl cyanide does not contain a conjugated chain, but on introduction into the alkaline solution, the double bond between the two carbons shifts in a manner such that a conjugated chain is produced and β-methylacrylonitrile results.

Homologs and other substituted derivatives of the compounds which still contain a conjugate chain, capable of 1:4 addition, or are capable of being converted into a compound having such a conjugated chain in the medium within which the xanthate is dissolved may be substituted for those specifically listed.

The age-controlling compounds or their derivatives mentioned above which are to be added to the xanthate or solution thereof need be soluble only to a sufficient extent to permit reaction. However, those compounds which have considerable solubility lend themselves to a wider variety and range of application. Preferably, the compound to be used should be sufficiently stable so that it will neither decompose nor self-polymerize at a rate more rapid than that at which it reacts to produce the salt-point changing effect in the xanthate or solution. Preferably the compound should be completely non-ionizable, though compounds having a low degree of ionization may be satisfactory.

In general, these age-controlling compounds have the effect of increasing the salt-point upon addition to the xanthate or solution. However, the particular rate of increase and the time period over which this increase will continue without further addition of the compounds depends upon the particular compound. For example, acrylonitrile when added in the amount of 2% on the viscose raises the salt-point from 4.5 to 12 within a period of ten minutes, whereas allyl cyanide in the same amount causes a change from 4.5 to 12 salt-point in twenty-four hours. In all cases the addition of a given amount of one of these compounds causes a rise in the salt-point up to a maximum, which maximum depends upon the particular compound and the amount in which it is added, after which the xanthate or solution again proceeds through an aging process, the rate of which depends upon the particular compound, some causing more rapid and others causing a slower rate of aging than that of any standard viscose solution of the same salt-point (that is, one having the maximum salt-point reached upon addition of the compound) under the same conditions. As stated above, the rate at which the rise occurs and the maximum rise obtainable depend upon each individual compound. By selecting a compound which effects a relatively small increase in salt-point (that is, one which has a relatively low maximum) and which is relatively slow both in producing this rise and in subsequent re-aging, the effect is to cause stabilization of the xanthate or solution for a period of time extending from the point of addition through the maximum to the subsequent time when hydrolysis after reaching the maximum again returns the viscose to its original salt-point. For example, the addition of 2% of $\alpha$-methyl acrylamide to viscose having a salt-point of 5 raised the point to 6.9 in 5 hours and the salt-point did not thereafter fall below 6.9 until 18 to 24 hours later.

While it is not desired to be limited to any particular theory of operation, it is thought that the compounds react with the sulfur-containing by-products which are produced upon hydrolysis of the xanthate, such as sodium trithiocarbonate, sodium sulfide and sodium hydrosulfide to produce carbon disulfide, and the development of this compound apparently effects further xanthation of the sodium cellulose or of the partially hydrolyzed cellulose xanthate. When acrylonitrile is used, the reactions seem to proceed as follows (disregarding the reaction of the acrylonitrile directly with the viscose):

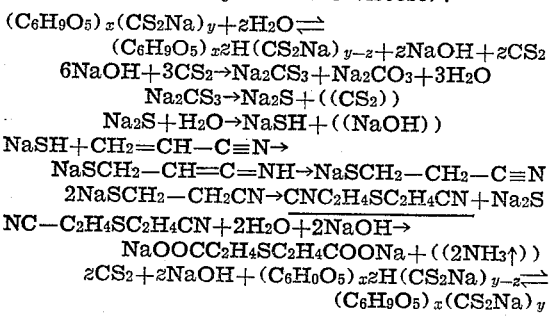

In the above series of equations, the insolubility of the $CNC_2H_4SC_2H_4CN$ (underlined in the equation above) apparently causes a shift of equilibrium which produces the carbon disulfide and sodium hydroxide (in double parentheses) in the third and fourth equations. The increase in concentration of carbon disulfide apparently causes a reversal of the first equation above in the manner represented by the last equation.

The effect of these age-controlling compounds on cellulose xanthate or solutions thereof, particularly the viscose solutions which find use for spinning filaments, for the production of films or sheets of cellophane, or for the production of plastic masses in general, may be used in various ways to adjust the age of the viscose. For example, one of these compounds in the desired amount may be added to the viscose after it has ripened to the proper extent for spinning purposes. By incorporating one of the compounds which has a slow rate of action, and which does not increase the salt-point to such an extent as to throw the viscose into a stage of ripening outside the range of spinnability under the conditions employed, a virtual stabilization is effected for that interval which is required for the viscose to go to a maximum salt-point and return to its original salt-point. Besides stabilizing during the period of spinning from a single tank of the spinning solution, a great improvement is noted in the compatibility of the "heel" of solution left in a given tank and the next batch of solution introduced therein. The incorporation of these compounds also serves to facilitate the control of the aging process in that it serves to minimize the variations in the salt-point caused by fluctuation in the conditions of storage. When pigments, delustrants, or other materials are to be mixed into the viscose, a small proportion of one of these age-controlling compounds may be added simultaneously to minimize the sensitivity of the aged viscose to the mechanical agitation necessitated by the mixing.

The amount of the age-controlling compound introduced in the viscose may vary considerably depending upon the particular effect desired. Amounts ranging from as low as about 0.1% to as much as 10% or more based on the viscose may be introduced at any one time. If desired, additional amounts may be introduced at regular intervals after the effect of the preceding addition has worn off. Such additions may be made repeatedly to rejuvenate an aged viscose. However, it is desirable to add sodium hydroxide in conjunction with the compounds when additions subsequent to the first or second are made. If desired, the age-controlling compounds may be used in conjunction with the conventional age-inhibiting compounds, such as sodium sulfites.

While preferred embodiments of the invention have been disclosed, it is to be understood that changes and variations may be made without departing from the spirit and scope of the invention as defined by the appended claims.

We claim:

1. The process of adjusting the age of alkaline cellulose xanthates and solutions thereof comprising the step of incorporating therein a compound selected from the group consisting of acrylonitrile. $\beta$-methylacrylonitrile, acrylamide, N-methyl acrylamide, N-butyl acrylamide, $\alpha$-methyl acrylamide, N-cyclohexyl acrylamide, $\beta$-methyl acrylamide, and allyl cyanide.

2. The process of adjusting the age of alkaline cellulose xanthates and solutions thereof comprising the step of incorporating acrylonitrile therein.

3. The process of adjusting the age of alkaline cellulose xanthates and solutions thereof comprising the step of incorporating $\alpha$-methyl acrylamide therein.

4. The process of adjusting the age of alkaline cellulose xanthates and solutions thereof comprising the step of incorporating $\beta$-methyl acrylamide therein.

JOHN P. HOLLIHAN, Jr.
SANFORD A. MOSS, Jr.

REFERENCES CITED

The following references are of record in the file of this patent:

UNITED STATES PATENTS

| Number | Name | Date |
|---|---|---|
| 863,793 | Ernst | Aug. 20, 1907 |
| 1,407,696 | Luft | Feb. 28, 1922 |
| 1,415,040 | Mitscherling | May 9, 1922 |
| 1,841,420 | Sperr, Jr. | Jan. 19, 1932 |
| 2,005,664 | Sagar et al. | June 18, 1935 |
| 2,011,227 | Maxwell | Aug. 13, 1935 |
| 2,234,626 | Bredee | Mar. 11, 1941 |

FOREIGN PATENTS

| Number | Country | Date |
|---|---|---|
| 332,628 | Great Britain | July 28, 1930 |
| 504,094 | Great Britain | Apr. 19, 1939 |

OTHER REFERENCES

Organic Chemistry, by Paul Karrer, Nordeman Pub. Co., 1938. (Copy in Scientific Library, Patent Office, Washington, D. C.)